United States Patent [19]
Lee

[11] Patent Number: 5,354,965
[45] Date of Patent: Oct. 11, 1994

[54] WINDOW CLEANING FLUID HEATING SYSTEM HAVING TIMER-CONTROLLED HEATER AND DIFFERENTIAL INPUT CIRCUIT

[75] Inventor: Sheng-Hann Lee, Cupertino, Calif.

[73] Assignee: Gensonic, Inc., Los Gatos, Calif.

[21] Appl. No.: 852,734

[22] Filed: Mar. 16, 1992

Related U.S. Application Data

[63] Continuation-in-part of Ser. No. 570,867, Aug. 21, 1990, abandoned.

[51] Int. Cl.$^5$ .......................... H05B 1/02; F24H 1/10; B60S 1/46; B67D 5/62
[52] U.S. Cl. ............................... 219/202; 15/250.05; 219/492; 219/505; 219/530; 219/540; 222/146.5; 239/284.1; 239/284.2; 392/441; 392/458; 392/480; 392/484
[58] Field of Search .................... 239/284.1, 284.2; 392/480–495, 444–448, 458, 441; 219/505, 504, 530, 540, 202–208, 492, 493; 15/250.05; 222/146.5, 146.1

[56] References Cited

U.S. PATENT DOCUMENTS

| | | | |
|---|---|---|---|
| 3,023,299 | 2/1962 | Mills | 392/459 |
| 3,309,503 | 3/1967 | Dow et al. | 392/354 X |
| 3,423,569 | 1/1969 | Cappell et al. | 219/207 X |
| 4,090,668 | 5/1978 | Kochenour | 239/284.1 |
| 4,177,375 | 12/1979 | Meixner | 219/441 |
| 4,242,999 | 1/1981 | Hoser | 219/206 X |
| 4,395,993 | 8/1983 | Tanaka et al. | 219/206 X |
| 4,508,957 | 4/1985 | Rocchitelli | 239/135 X |
| 4,555,743 | 11/1985 | Kokubu et al. | 219/492 X |
| 4,768,716 | 9/1988 | Buchanan et al. | 239/284.1 |
| 4,894,520 | 1/1990 | Moran | 219/497 |

FOREIGN PATENT DOCUMENTS

| | | | |
|---|---|---|---|
| 2359372 | 5/1974 | Fed. Rep. of Germany | 392/485 |
| 2353738 | 5/1975 | Fed. Rep. of Germany | 239/284.2 |
| 2555841 | 6/1977 | Fed. Rep. of Germany | 392/485 |
| 2651285 | 5/1978 | Fed. Rep. of Germany | 392/485 |
| 2909220 | 9/1980 | Fed. Rep. of Germany | 392/487 |
| 1460494 | 11/1966 | France | 392/485 |
| 2419849 | 10/1979 | France | 219/465 |
| 55-110645 | 8/1980 | Japan | 392/487 |

Primary Examiner—Anthony Bartis
Attorney, Agent, or Firm—Donald J. Pagel, Jr.

[57] ABSTRACT

A system for electrically heating a volume of windshield cleaning fluid in a motor vehicle includes a metallic vessel connected between a windshield fluid reservoir and a nozzle for spraying the windshield with the fluid. The vessel has a metal heater wall heated by PTC thermistors thereon and provided with a plurality of metal heat exchange pins extending into an internal chamber in the vessel through which the fluid flows to be heated. A control circuit is provided and includes an electronic timer circuit for controlling the length of time the thermistors are energized to heat the fluid in accordance with the prevailing ambient temperature, an engine speed sensor including a pulse stretching circuit for preventing energization of the thermistors if the engine of the vehicle is not running, and a differential input circuit for simplifying the attachment of the system to a standard windshield cleaning fluid pump.

10 Claims, 5 Drawing Sheets

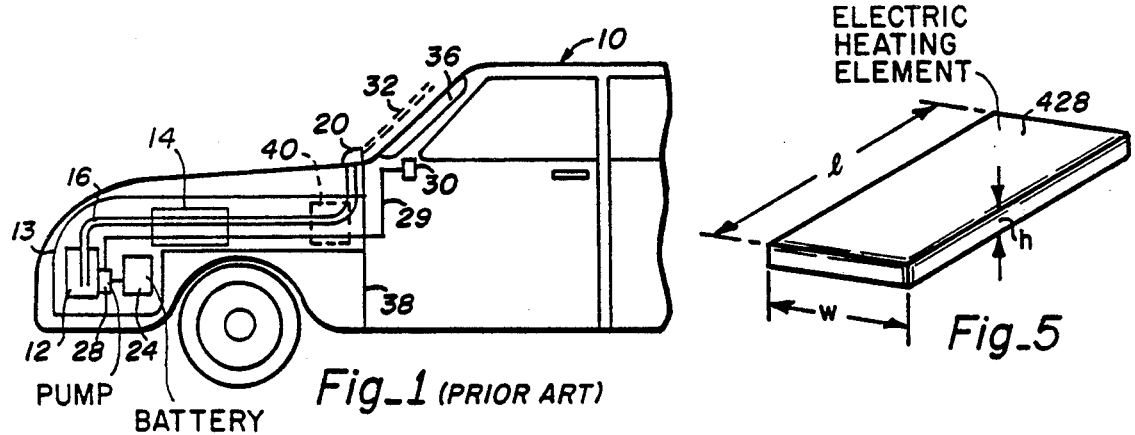
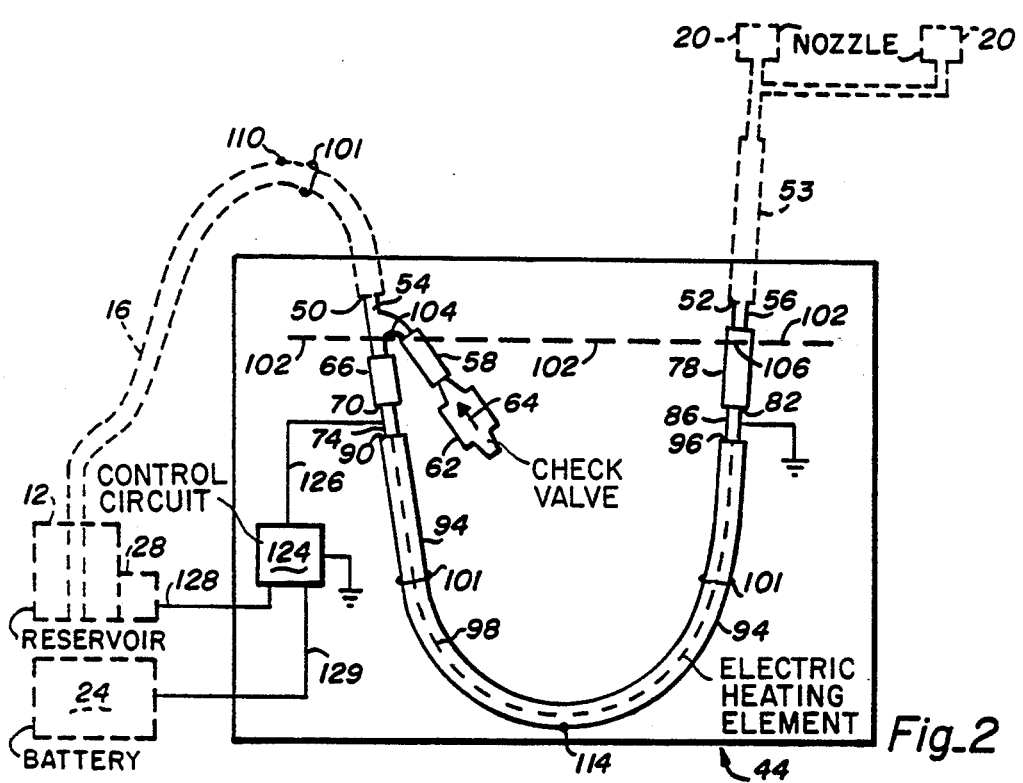

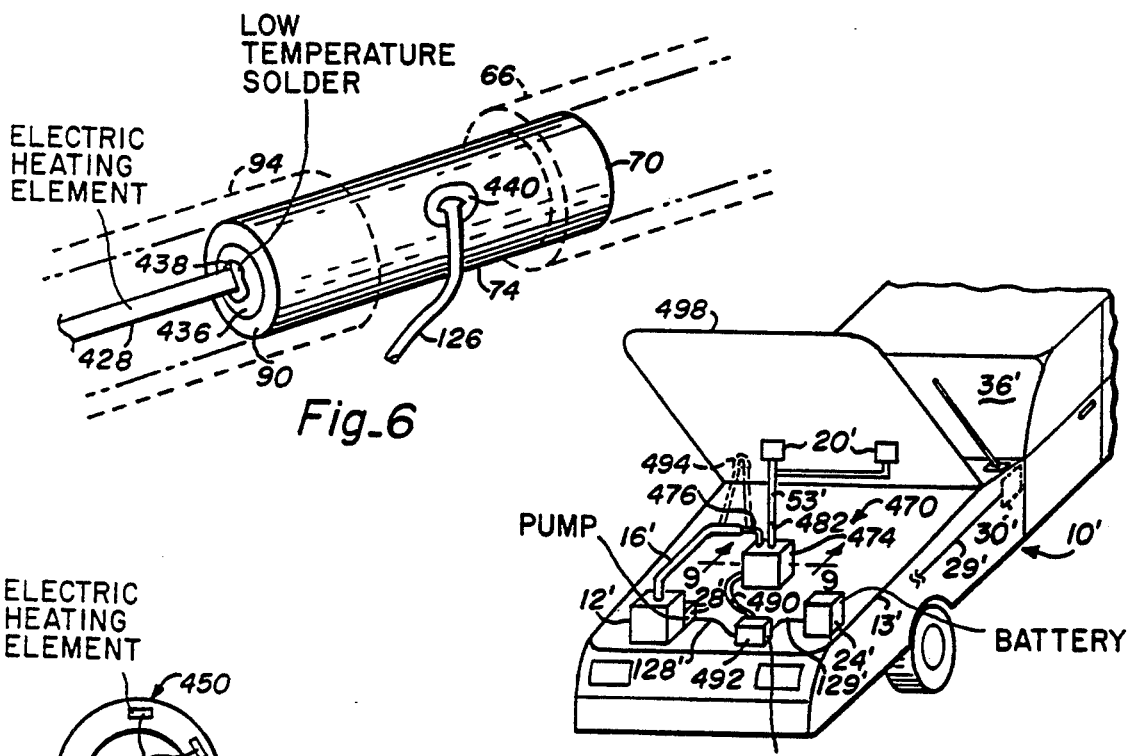
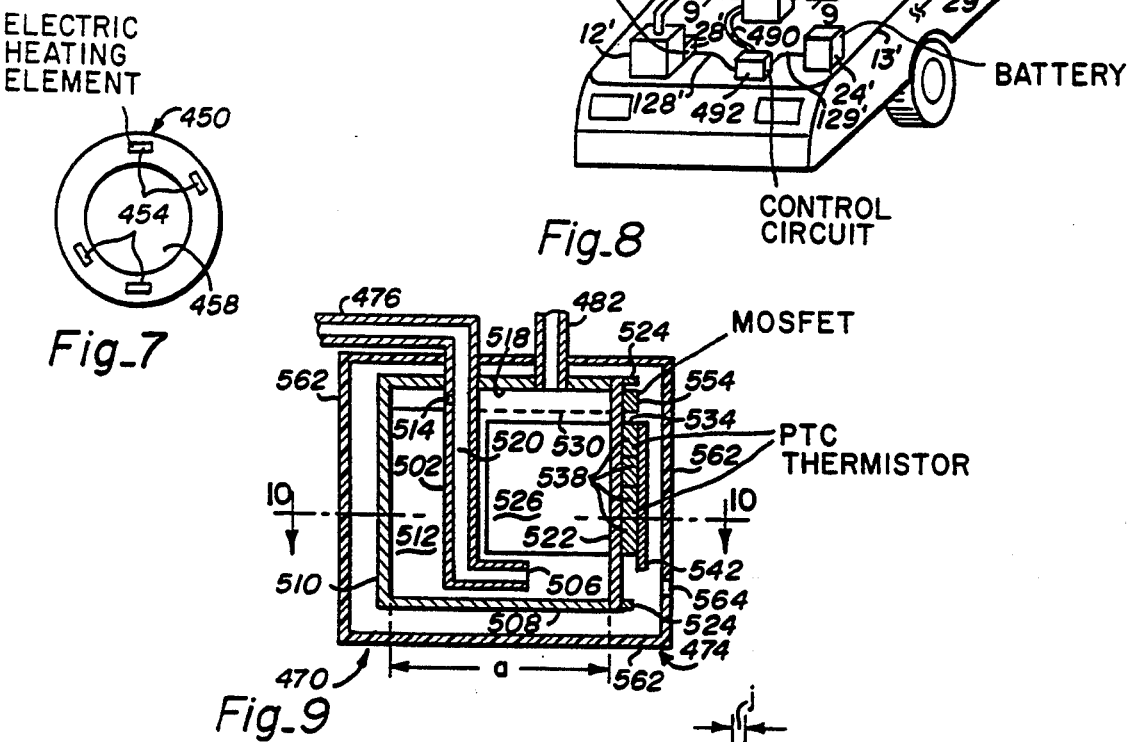
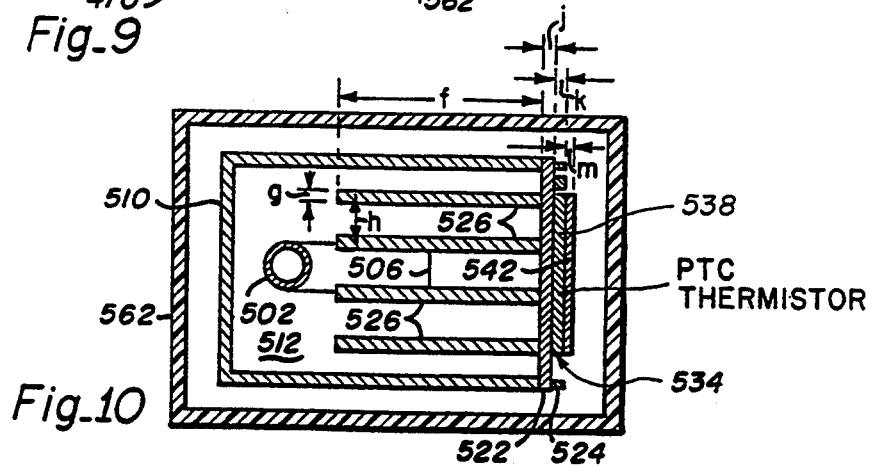

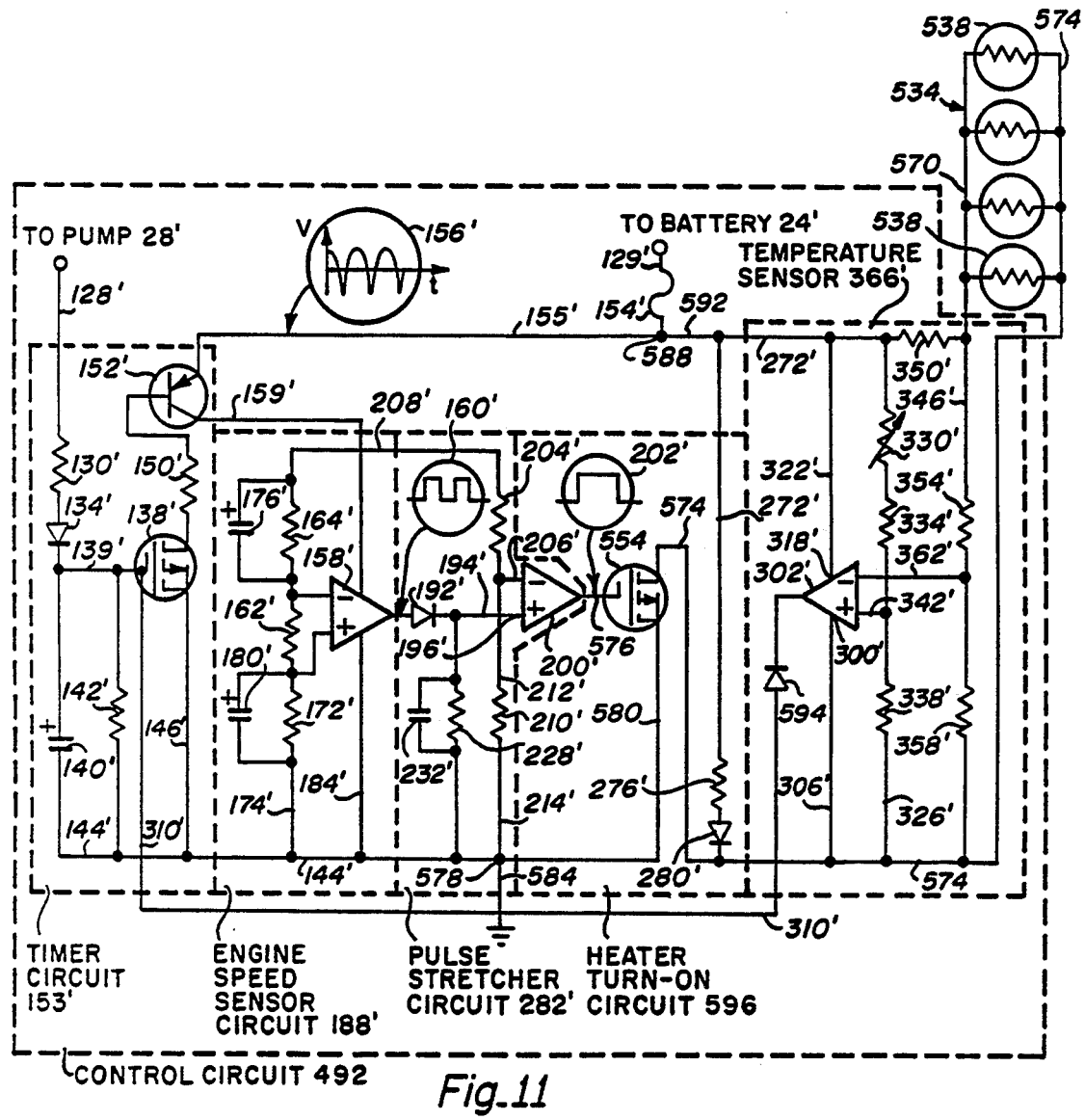
Fig_11
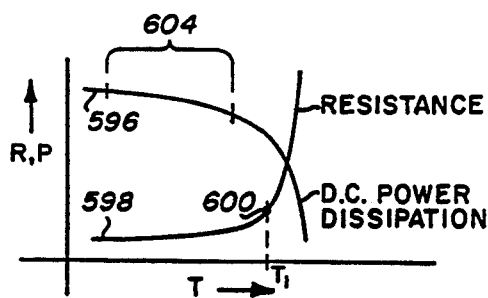
Fig_12

WINDOW CLEANING FLUID HEATING SYSTEM HAVING TIMER-CONTROLLED HEATER AND DIFFERENTIAL INPUT CIRCUIT

This is a continuation-in-part of application Ser. No. 07/570,867 filed on Aug. 21, 1990, now abandoned.

BACKGROUND OF THE INVENTION

1. Field of the Invention

The present invention relates to a system for automatically removing view-obstructing materials such as ice, dirt or inside condensation from the windows of a vehicle, and more particularly to a system for heating the windshield cleaning fluid in the vehicle before it is sprayed on the windshield.

2. Description of the Prior Art

The need to automatically remove view-obstructing materials such as ice, snow, sleet, condensation or dirt from the windows of a vehicle is a well-known problem. For example, FIG. 1 illustrates a system for spraying a stream of cleaning fluid on a windshield that is available in most of the passenger vehicles sold in the United States today. A problem with this type of system is that it is not very effective at removing frozen precipitation such as ice or snow, or in removing other view-obstructing materials, such as impacted insects, from the windshield.

Products are commercially available that attempt to improve the performance of the system shown in FIG. 1 by providing a means for heating the cleaning fluid before it is sprayed on the windshield. One type of product includes a heating element that is immersed in the cleaning fluid reservoir 12 (shown in FIG. 1) in order to heat all of the fluid in the reservoir. A problem with this technique is that heating the entire reservoir is a very slow process. Additionally, the temperature to which the cleaning fluid can be heated is limited by the material from which the reservoir is constructed. Another product, used to prevent the windshield cleaning fluid from freezing, includes a second tube that is positioned in close proximity to the tube 16 of FIG. 1. Engine coolant fluid is directed through the second tube to heat the cleaning fluid contained in the tube 16. However, this is not a very effective process because the efficiency of heat transfer between the two tubes is not great and because it is impractical to have the two tubes run in parallel over a long distance.

Another approach is to direct the windshield cleaning fluid into a separate vessel in which the heating of the fluid takes place. For example, O. Rocchitelli, in U.S. Pat. No. 4,508,957 (issued Apr. 2, 1985), describes a cartridge-type device that uses thermistors to heat the windshield cleaning fluid flowing through the cartridge device.

Similarly, H. Schlick, in U.S. Pat. No. 4,212,425 (issued Jul. 15, 1980) and U.S. Pat. No. 4,088,269 (issued May 9, 1978), describes a spray nozzle that utilizes a PTC thermistor heating element to heat windshield cleaning fluid before it is sprayed on a windshield. None of these devices utilize optimized designs or disclose control circuitry for controlling the functioning of the heating devices.

Additional patents that are related to the field of windshield cleaning fluid heating technology include: U.S. Pat. No. 4,832,262 (H. Robertson et al., May 23, 1989) which discloses a heat exchanger that utilizes the exhaust system of an internal combustion engine for heating the windshield cleaning fluid; U.S. Pat. No. 4,798,230 (S. Hopperdietzel, Jan. 17, 1989) which discloses a plastic hose having embedded conductors for heating fluid contained in the hose; U.S. Pat. No. 4,575,003 (R. Linker, et al., Mar. 11, 1986) which discloses a system that utilizes the engine coolant system to heat the windshield cleaning fluid; and U.S. Pat. No. 3,888,412 (H. Lindo, Jun. 10, 1975) which also discloses a system that utilizes the engine coolant system to heat windshield cleaning fluid.

SUMMARY OF THE INVENTION

It is therefore an object of the present invention to provide a window cleaning system that will rapidly remove ice or other frozen precipitation from the windshield of a vehicle.

It is another object of the present invention to provide a window cleaning system that will reduce condensation from forming on the inside of a windshield.

It is another object of the present invention to provide a window cleaning system that will facilitate the removal view-obstructing material such as dirt and impacted bugs from the windshield.

It is another object of the present invention to provide a window cleaning system that is safe, inexpensive and easy to install.

Briefly, the preferred embodiment of the present invention comprises a metal vessel for holding a volume of windshield cleaning fluid while it is heated and a control circuit for controlling the fluid heating process. The heating of the fluid is accomplished by a plurality of positive temperature control (PTC) thermistors positioned on the outside of the vessel and a plurality of tapered cylindrical metal structures ("pins") inside the vessel that transfer heat from the thermistors to the cleaning fluid. The control circuit includes a timer circuit for controlling the length of time the thermistors remain on, an engine speed sensor for inactivating the system when the vehicle engine is not running and a differential input circuit for simplifying the attachment of the system to a standard windshield cleaning fluid pump.

Another embodiment of the present invention comprises a U-tube cleaning fluid heating system that is inserted between the cleaning fluid reservoir and the spray nozzles of an existing windshield cleaning system in a motor vehicle. The U-tube cleaning fluid heating system comprises a "U" shaped heating tube that contains a plurality of elongated heating elements. Windshield cleaning fluid is held in the "U" shaped section of the heating tube where it is heated by the heating elements. After being heated to a predetermined temperature, the heated cleaning fluid can be sprayed on the windshield of the vehicle by depressing a control button inside the vehicle. In an alternative embodiment, a cartridge heater that uses thermistors as the heating elements replaces the "U" shaped heating tube.

In the U-tube system, the heating elements are connected to metal terminals that are inserted into both ends of the heating tube. The metal coupler that is closest to the fluid reservoir is connected to a control circuit that draws current from the vehicle battery and controls the heating of the heating elements. The other coupler is grounded to the body of the vehicle.

The control circuit includes a timer circuit, an engine speed sensor, a pulse stretcher circuit, a heater turn-on circuit and a temperature sensor. The timer circuit activates the heating elements for a predetermined period of time. The engine speed sensor protects the vehicle battery from being run down by preventing the control circuit from being activated when the vehicle engine is not running. The engine speed sensor functions by detecting the 50 mV AC noise signal that is present in the vehicle electrical system when the engine is running. The pulse stretcher circuit provides a constant signal that is used to activate the heater turn-on circuit. The heater turn-on circuit turns on the heating elements and the temperature sensor shuts off the control circuit if the temperature in the heating elements exceeds a predetermined limit.

In addition to the temperature sensor, several other safety features are designed into the U-tube window cleaning fluid heating system to prevent overheating of the system. For example, low temperature solder connections are used to connect the heating elements to the metal coupler, the physical parameters of the heating elements are selected to keep the temperature of heating elements low, and high temperature tubing is used in system that will withstand the highest temperature attainable by the heating elements with a wide margin of safety.

When the motor vehicle operator depresses the windshield spray button a second time, a stream of heated cleaning fluid is sprayed on the windshield, thereby melting ice or other frozen precipitation that has accumulated on the windshield. The heated cleaning fluid also reduces condensation on the inside of the windshield because spraying heated fluid on the outside surface of the windshield moves the hot-cold interface to the outside surface where condensation can be removed by the windshield wipers. The heated cleaning fluid is also more effective at removing dirt and insects from the windshield because of the increased solubility of these materials in hot cleaning fluid.

In the alternative embodiment of the windshield cleaning fluid heating system, a cartridge heater replaces the "U" shaped heating tube. The cartridge heater comprises a metal chamber that is inserted between the cleaning fluid reservoir and the fluid spray nozzles. A control circuit, similar to the control circuit already described, controls a thermistor heating slab positioned on the outside of the metal chamber. The heating slab comprises a plurality of PTC thermistors that are in thermal contact with a metal wall of the chamber. A plurality of metal fins are in thermal contact with the metal wall and extend into a fluid cavity inside the chamber. When the control button inside the vehicle is depressed, cleaning fluid fills the fluid cavity of the metal chamber and surrounds the metal fins. Simultaneously, the control circuit activates the plurality of thermistors which heat the metal wall and fins, thus heating the cleaning fluid which surrounds the metal fins. When the control button is depressed again, unheated cleaning fluid enters the metal chamber from the bottom and forces hot cleaning fluid out the top of the metal chamber through the fluid spray nozzles.

An advantage of the present invention is that the heated cleaning fluid can be used to melt ice or other frozen precipitation that accumulates on the windshield.

Another advantage of the present invention is that the heated cleaning fluid removes stubborn view-obstructing materials from the windshield more efficiently than unheated fluid.

Another advantage of the present invention is that the heated cleaning fluid reduces condensation on the inside of the windshield.

Another advantage of the present invention is that the engine speed sensor protects the vehicle battery from running down by preventing the heating elements from being activated when the engine is not running.

Another advantage of the present invention is that the engine speed sensor functions without the need to hardwire the ignition system.

Yet another advantage of the present invention is that the control circuit is triggered without the need of running wiring to the vehicle dashboard.

Another advantage of the present invention is that built in safety features prevent the system from overheating.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a schematic illustration of a windshield cleaning system according to the prior art;

FIG. 2 is a schematic illustration of a U-tube window cleaning fluid heating system according to the present invention;

FIG. 4 is a perspective view of a heating tube containing a plurality of individual heating strips;

FIG. 5 is a perspective view of one of the individual heating strips of FIG. 5;

FIG. 6 is a perspective view of the active terminal used in the present invention;

FIG. 7 is an end view of an alternative embodiment of a heating tube in which the multiple heating strips are embedded in the wall of the heating tube;

FIG. 8 is a schematic illustration of an alternative embodiment of the present invention referred to as a cartridge heater window cleaning fluid heating system;

FIG. 9 is a cross-sectional view of a cartridge heater taken along the line 9—9 in FIG. 8;

FIG. 10 is a cross-sectional view of the cartridge heater taken along the line 10—10 in FIG. 9;

FIG. 11 is a circuit diagram of a control circuit for use with the cartridge heater window cleaning fluid heating system;

FIG. 12 is a graphical representation illustrating the variation of D.C. power dissipation and resistance with temperature for a PTC thermistor;

DETAILED DESCRIPTION OF THE PREFERRED EMBODIMENT

Figure 3:
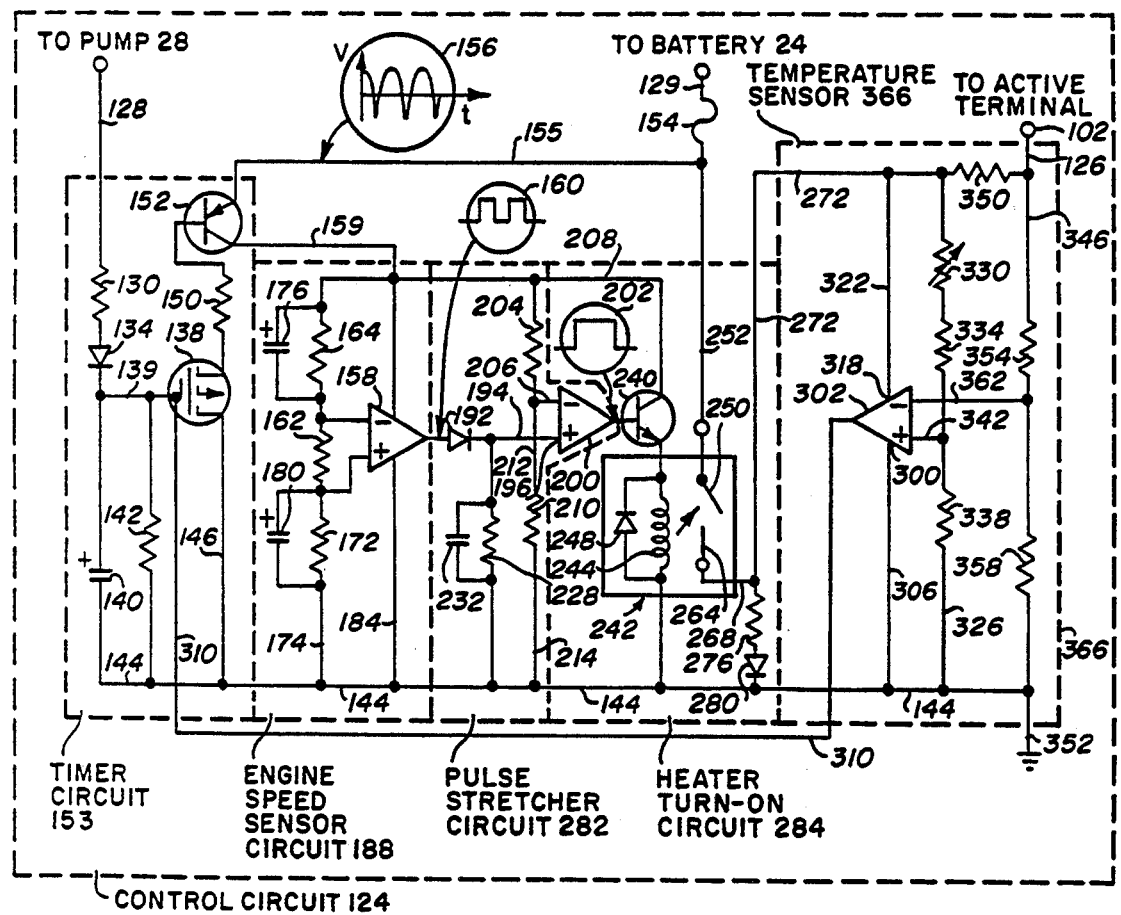
FIG. 3 is a circuit diagram of a control circuit according to the present invention.

FIG. 1 shows a schematic view of a conventional windshield cleaning system, contained in a motor vehicle 10, according to the prior art. Windshield cleaning fluid, such as a water/methanol solution, is stored in a reservoir 12 which is normally located in an engine compartment 13 of the motor vehicle 10. Typically, the motor vehicle 10 is powered by an internal combustion engine 14 that is housed in the engine compartment 13. A tube 16 connects the reservoir 12 to a nozzle 20. A battery 24, such as a standard 12 V direct current (DC) automobile battery, supplies power to a pump 28. As is well-known, a standard 12 V automobile battery actually delivers about 13.6 V at 25° C. A lead 29 connects a pump button 30, located inside of the motor vehicle 10, to the pump 28. When the pump button 30 is depressed, the pump 28 is activated. This causes windshield cleaning fluid to flow through the tube 16 and a stream 32 of windshield cleaning fluid is sprayed on a windshield 36 by the nozzle 20. Typically, two nozzles are included in the conventional windshield cleaning system for providing a stream 32 of windshield cleaning fluid to the right and left sides of the windshield 36. A pair of windshield wiper blades (not shown) are then used to spread the cleaning fluid across the windshield, thereby achieving the desired cleaning. A firewall 38 separates the engine compartment 13 from the inside of the motor vehicle 10. A dashed rectangle 40 illustrates the approximate area where a window cleaning fluid heating system according to the present invention is inserted into the conventional windshield cleaning system.

FIG. 2 illustrates a U-tube window cleaning fluid heating system 44 according to the present invention. The system 44 is designed to be inserted into the area in FIG. 1 illustrated by the dashed rectangle 40. Typically, this area is inside the engine compartment 13 near the firewall 38. In FIG. 2, elements of the prior art are indicated by dashed lines and elements of the present invention are indicated by solid lines. The system 44 is inserted between the reservoir 12 and the nozzles 20 in a space created by cutting the tube 16 at the locations 50 and 52 and removing a section of the tube 16. For clarity of description, after the tube 16 has been cut, the section of the tube 16 that remains attached to the nozzles 20 is designated as a tube 53. The system 44 is connected between the tubes 16 and 53 by inserting a "Y" connector 54 and a straight connector 56 into the ends of the tubes 16 and 53 at the locations 50 and 52, respectively. A first connecting tube 58 connects one arm of the "Y" connector 54 to a check-valve 62. An arrow 64 indicates the direction of fluid flow permitted by the check-valve 62. A second connecting tube 66 connects a second arm of the "Y" connector 54 to one end 70 of a hollow active terminal 74. A third connecting tube 78 connects the straight connector 56 to one end 82 of a hollow grounded terminal 86.

The check-valve 62 is a chemically resistant backflow valve such as the polyethylene tubing check valve, Stock No. 64001, available from United States Plastic Corporation of Lima, Ohio. The check-valve 62 allows fluid, including air, to flow in the direction of the arrow 64, but not in the direction opposite to the arrow 64. The straight and "Y" connectors 56 and 54 are hollow connectors comprised of a chemically inert material such as polypropylene. The connecting tubes 58, 66 and 74 are pieces of hollow, chemically resistant tubing such as silicon tubing. The active and grounded terminals 74 and 86 are hollow tubes comprised of a chemically resistant metal such as brass.

A second end 90 of the active terminal 74 is inserted into one end of a heating tube 94, and a second end 96 of the grounded terminal 86 is inserted into the other end of the heating tube 94. The heating tube 94 is a long piece of hollow, flexible tubing (approximately four feet in length) comprised of a chemical and heat resistant material such as silicon rubber having a melting point greater than 500° F. A heating element 98 is contained within the heating tube 94 and one end of the heating element 98 is electrically connected to the active terminal 74. The other end of the heating element 98 is electrically connected to the end 96 of the grounded terminal 86. As is discussed later, the heating element 98 is comprised of a plurality of elongated nickel heating strips which are electrically connected in parallel. For the purpose of clarity, the heating element 98 is depicted as a single strip in FIG. 2.

As is shown in FIG. 2, the heating tube 94, the connecting tubes 66 and 78, the connectors 54 and 56 and the terminals 74 and 86 are positioned between the locations 50 and 52 so that a U-shaped section is formed. A plurality of fastening means 101, such as Nylon ties, are utilized to secure the tubes 16 and 94 to the chassis of the vehicle 10. The U-shaped section functions as a trap to hold a volume of window cleaning fluid under the conditions that will be described below. A reference line 102 that bisects the "Y" connector 54 and the connecting tube 78 indicates the level of the volume of window cleaning fluid held in the U-shaped section under these conditions. A pair of reference locations 104 and 106 are defined as the locations where the reference line 102 crosses the "Y" connector 54 and the connecting tube 78 respectively. A reference point 110 denotes the highest part of the tube 16 and a reference point 114 denotes the lowest part of the heating tube 94.

The active terminal 74 is electrically connected to a control circuit 124 by a lead 126. A lead 128, which may comprise a plurality of wires, electrically connects the control circuit 124 to the pump 28 and a lead 129 electrically connects the control circuit 124 to the battery 24. The grounded terminal 86 and the control circuit 124 are grounded to the chassis of the motor vehicle 10.

FIG. 3 illustrates the components of the control circuit 124. One end of a resistor 130 is connected to the lead 128 and the other end of the resistor 130 is connected to a diode 134. A metal oxide semiconductor field effect transistor (MOSFET) 138 is connected to the diode 134 by a lead 139. A capacitor 140 and a resistor 142 are each connected in parallel between the lead 139 and a lead 144. The source of the MOSFET 138 is connected to the lead 144 by a lead 146. A resistor 150 and the base of a PNP transistor 152 are connected in series to the drain of the MOSFET 138. The components described in this paragraph comprise a timer circuit 153 indicated by the dashed rectangle labelled timer circuit 153 in FIG. 3.

The emitter of the transistor 152 is connected to a fuse 154 by a lead 155. The fuse 154 is connected to the battery 24 by the lead 129. Although the battery 24 is a DC battery, an AC voltage component 156 is found on the DC voltage supplied by the battery 24 when the engine 14 is running. Typically, the AC voltage component 156 has the periodic waveform shown in the bubble in FIG. 3, with a peak-to-peak magnitude of approximately 50 mV and a frequency which is a function of the engine rpm and the number of cylinders in the engine. The AC voltage component 156 is passed to the transistor 152 via the lead 155.

The collector of transistor 152 is connected to a voltage comparator 158 by a lead 159. The voltage comparator 158 is a standard integrated circuit (IC) device such as an LM2904 operational amplifier supplied by National Semiconductor and other companies. In the preferred embodiment, only one half of the LM2904 operational amplifier chip is utilized as the voltage comparator 158. The output of the comparator 158 is a rectangular wave 160. A resistor 162 (3.3 KΩ) is connected between the reference inputs of the comparator 158. A resistor 164 (3.3MΩ) is connected to one side of the resistor 162 and a resistor 172 (4.7 MΩ)is connected to the other side of the resistor 162. The other end of the resistor 172 is connected to the lead 144 by a lead 174. A capacitor 176 (22 μF) is connected in parallel with the resistor 164 and a capacitor 180 (22 μF) is connected in parallel with the resistor 172. A lead 184 connects a ground terminal of the comparator 158 to the lead 144. The components described in this paragraph comprise an engine speed sensor circuit 188 indicated by the dashed rectangle labelled engine speed sensor 188 in FIG. 3.

A diode 192 is connected between an output of the comparator 158 and a lead 194 which is connected to an input (noninverting) terminal 196 of a voltage comparator 200. In the preferred embodiment, the voltage comparator 200 is the other half of the LM 2904 operational amplifier chip described previously with respect to the voltage comparator 158. The output of the comparator 200 is a single "stretched" pulse 202 which has a continuous pulse width when the engine 14 is running. A resistor 204 is connected between an input (inverting) terminal 206 and a lead 208 which is connected to the resistor 164. A resistor 210 is connected to the resistor 204 by a lead 212 and to the lead 144 by a lead 214. A resistor 228 (22 MΩ) is connected between the lead 194 and the lead 144, and a capacitor 232 (0.1 μF) is connected in parallel with the resistor 228. The base of an NPN transistor 240 is connected to an output of the comparator 200. The collector of transistor 240 is connected to the lead 208 and the emitter of transistor 240 is connected to an electromechanical relay 242. The relay 242 includes a solenoid 244 that is connected between the transistor 240 and the lead 144. A diode 248 is connected in parallel with the solenoid 244. The solenoid 244 couples with a switch 250 that is connected to the fuse 154 by a lead 252. A contact 264 of the switch 250 is connected to a lead 268. The lead 268 is connected to a lead 272 that includes a resistor 276 and a light emitting diode (LED) 280. The LED 280 is connected to the lead 144. The combination of the diode 192, the resistors 228, 204 and 210, and the capacitor 232 and the voltage comparator 200 are referred to as a pulse stretcher 282. The remainder of the components described in this paragraph comprise a heater turn-on circuit 284 indicated by the dashed area labelled heater turn-on circuit 284 in FIG. 3.

The lead 144 is connected to a ground terminal 300 of a voltage comparator 302 by a lead 306. The voltage comparator 302 is a standard integrated circuit device such as an LM2903 voltage comparator available from National Semiconductor and other companies. The gate of the MOSFET 138 is connected to the output terminal of the comparator 300 by a lead 310. A power supply terminal 318 of the comparator 300 is connected to the lead 272 by a lead 322. A lead 326 is connected between the leads 272 and 144 and includes a variable resistor 330 and a pair of resistors 334 and 338 connected in series. A lead 342 connects the lead 326 to an input (noninverting) terminal of the amplifier 302 between the resistors 334 and 338. The lead 272 is connected to a lead 346 via a resistor 350 (0.005Ω). The lead 346 is grounded at an end 352 and is connected to the active terminal 102 at the other end by the lead 126. The lead 346 includes the resistors 354 and 358 and is connected to an input (inverting) terminal of the amplifier 302 by a lead 362. The components described in this paragraph comprise a temperature sensor circuit 366 indicated by the dashed rectangle labelled temperature sensor circuit 366 in FIG. 3.

FIG. 4 illustrates the heating element 98 in more detail. Examination of FIG. 4 shows that the heating element 98 is comprised of a plurality of individual heating strips 428 positioned in a passageway (or lumen) 432 located inside of the heating tube 94. The passageway 432 has a diameter "d" of approximately 0.375 inches. In the preferred embodiment, four of the individual heating strips 428, electrically connected in parallel, are positioned in the passageway 432. Each of the individual heating strips 428 are elongated pieces of electrically conductive material, such as nickel.

FIG. 5 illustrates one of the individual heating strips 428 in more detail. Each individual heating strip 428 is a long, thin, rectangular-shaped piece of nickel ribbon. Nickel is chosen because it is sufficiently inert to resist chemical degradation of the heating strip 428 by the windshield cleaning fluid and because nickel has electrical properties that provide the desired heating characteristics for the system 44. Each individual heating strip 428 has a width "w", a height "h" and a length "l". In the preferred embodiment, representative values for these dimensions are: w=0.049 inches, h=0.002 inches and l=48 inches.

FIG. 6 illustrates the active terminal 74 in more detail and shows how the individual heating strips 428 are attached to the terminal 74 (for clarity, only one of the individual heating strips 428 is shown). The active terminal 74 is comprised of a conductive, chemically inert material, such as brass, and includes a fluid passageway 436 that allows fluid to flow through the terminal 74 between the connecting tube 66 and the heating tube 94. The individual heating strip 428 is electrically connected to the terminal 74 by soldering the heating strip 428 to an area 438 on the inside of the terminal 74 along the fluid passageway 436. The lead 126 is electrically connected to the active terminal 74 by soldering the lead 126 to an area 440 on the outside of the terminal 74 that is not covered by the connecting tube 66 or the heating tube 94. The individual heating strips 428 are connected to the grounded terminal 86 in the same manner as is illustrated in FIG. 6 for the connection to the active terminal 74.

In the preferred embodiment, as a safety measure, a low temperature solder is used to make the connection of the heating strips 428 to the area 438 on the inside wall of the active terminal 74. This ensures that if a problem develops in the system 44, which causes the system to begin overheating, the connection between the heating strips 428 and the active terminal 74 will break before the heating tube 94 melts.

FIG. 7 illustrates an alternative embodiment for the heating tube 94 represented by the general reference numeral 450. In the heating tube 450, a plurality of individual heating elements 454, which are functionally equivalent to the heating strips 428, are embedded in the wall of the heating tube 450 instead of being positioned in a fluid passageway 458 inside of the tube 450.

FIG. 8 illustrates an alternative embodiment of the present invention referred to as a cartridge heater window cleaning fluid heating system 470. In FIG. 8 (and in FIGS. 9–11), elements that are similar to elements already described with respect to FIGS. 1–7 are identified by the same numeral used in FIGS. 1–7 followed by a prime symbol. A cartridge heater 474 is installed between the windshield cleaning fluid reservoir 12' and the pair of cleaning fluid spray nozzles 20' by connecting the tube 16' to a fluid inlet 476 and connecting the tube 53' to a fluid outlet 482. A plurality of electrical leads 490 connect the cartridge heater 474 to a control circuit 492. A loop 494 (illustrated in FIG. 8 by dashed lines), illustrates a preferred configuration for the tube 16' in which the tube 16' is looped about an engine compartment hood 498 to form the loop 494.

FIG. 9 illustrates the cartridge heater 474 in more detail. The fluid inlet 476 is a hollow tube that includes an elongated L-shaped member 502 having an end 506 that extends down to, and runs parallel to, a bottom member 508 of a fluid containment vessel 510. The fluid containment vessel 510 is a fluid-tight vessel having a fluid chamber 512 that is accessible through the fluid inlet 476 and the fluid outlet 482. The fluid containment vessel 510 is comprised of a material, such as aluminum, that is a good thermal conductor, is light, inexpensive and corrosion resistant, and that can be mass produced inexpensively, such as by casting. A vent 514 is positioned on the side of the elongated member 502 that faces away from the fluid outlet 482. The vent 514 is positioned near a top member 518 of the fluid containment vessel 510 and comprises an opening that extends from a fluid passageway 520 inside of the fluid inlet 476 to the fluid chamber 512. A fluid heating assembly wall 522 forms a side wall of the fluid containment vessel 510. The fluid heating assembly wall 522 is attached to the bottom and top members 508 and 518 by a plurality of bolts 524. A plurality of heating fins 526 (only one is shown in FIG. 9) extend from the wall 522 into the fluid chamber 512. The wall 522 and the heating fins 526 are comprised of a good thermal conducting material such as aluminum or copper. Generally, surfaces of the wall 522 and the heating fins 526 that are exposed to the cleaning fluid are chemically treated so as to increase the resistance of the copper or aluminum to chemical corrosion.

A fluid level line 530, positioned just below the vent 514, indicates the level achieved by the cleaning fluid in the chamber 512 when the chamber 512 is vented to the atmosphere through the fluid outlet 482. Typically, the fluid chamber 512 has a capacity of approximately 100 ml and contains approximately 85 ml of cleaning fluid when the chamber 512 is filled to the fluid line 530. The fluid chamber 512 has a width "a" of approximately 0.80 inches.

A heater slab 534 is mounted on the opposite side of the fluid heater assembly wall 522 from the heating fins 526. The heater slab 534 is comprised of a plurality of thermistors 538 electrically connected in parallel and mounted in thermal communication with the wall 522 (meaning that thermal energy is transferred from the thermistors 538 to the wall 522). A connecting terminal 542 runs along the heater slab 534 for providing an electrical connection to the thermistors 538. A MOSFET 554 is also positioned on the outside of the wall 522. The plurality of electrical leads 490 (shown in FIG. 8) connect to the terminal 542 and the MOSFET 554 for providing electrical connection between the control circuit 492 and the thermistors 538 and MOSFET 554. A thermoplastic shield 562 surrounds the fluid containment vessel 510. An aperture 564 is positioned in the side of the thermoplastic shield for providing access to the plurality of electrical leads 490.

FIG. 10 is a cross-sectional view of the cartridge heater 474 that shows the heating fins 526 in more detail. The heating fins 526 are solid rectangular shaped pieces of metal, such as aluminum, having a length "f" and a thickness "g". Adjacent fins 526 are separated by a pitch "h". The wall 522 has a thickness "j", the heater slab has a thickness "k" and the connector 542 has a thickness "m". Representative values for the dimensions of the cartridge heater 474 are as follows: f=0.60 inches, g=0.01 inches, h=0.04 inches, j=0.20 inches, m=0.02 inches and a=0.80 inches.

FIG. 11 illustrates the control circuit 492 in more detail. The control circuit 492 is similar to the control circuit 124 already described with respect to FIG. 3. Elements of the control circuit 492 that are similar to elements already described in connection with the control circuit 124 are designated by the same numeral used in FIG. 3 followed by a prime symbol.

The heater slab 534 is connected to the control circuit 492 by a pair of leads 570 and 574 with the plurality of thermistors 538 being connected in parallel between the leads 570 and 574. The lead 570 is connected to the lead 346' between the resistor 350' and the resistor 354'. The lead 574 is connected to the drain of the MOSFET 554. The leads 306', 326', the LED 280' and the resistor 358' are all connected to the lead 574. The gate of the MOSFET 554 is connected to the operational amplifier 200' by a lead 576 and the source of the MOSFET 554 is connected to the lead 144' at a node 578 by a lead 580. The node 578 is connected to ground by a lead 584. The lead 272' is connected to the fuse 154' and the lead 155' at a node 588 by a lead 592. The leads 570, 574, 576 and 580 correspond to the plurality of leads 490 shown in FIG. 8. A low leakage diode 594 is positioned on the lead 310' between the MOSFET 138' and the output terminal of the voltage comparator 302' to ensure that the capacitor 140' can only be discharged by the comparator 302'.

The thermistors 538 are positive temperature coefficient (PTC) type thermistors such as barium titanate ($BaTiO_3$) thermistors. The heater slab 534 is modeled on a commercially available heating element referred to as a "heater for hot wind", available, for example, from Murata Erie North America, Inc., Part No. PTH530A01AF700Y125. The "heater for hot wind" includes a PTC thermistor heater slab and a connecting terminal similar to the heater slab 534 and the connecting terminal 542. However, in the "heater for hot wind", the plurality of heating fins that are analogous to the heating fins 526, are sized and oriented differently than the heating fins 526 of the heater slab 534.

The MOSFET 554 is an enhancement type MOSFET meaning that a gate voltage greater than the threshold voltage is required to turn on the MOSFET 554. The MOSFET 554, the resistor 276' and the LED 280' comprise a heater turn-on circuit 596 indicated by the dashed area labelled heater turn-on circuit 596 in FIG. 11. The timer circuit 153', the engine speed sensor 188', the pulse stretcher circuit 282' and the temperature sensor 366' are all comprised of components already described with respect to FIG. 3.

FIG. 12 illustrates a D.C. power dissipation curve 596 and a temperature dependent resistance curve 598 for the thermistors 538. A point 600 on the resistance curve 598 denotes a temperature $T_1$ above which the resistance of the thermistors 538 increases exponentially. The point 600 is commonly referred to as the "Currie" point—the point where the resistance is twice the resistance at 25° C. A region 604 on the power dissipation curve 596 denotes a region of high and relatively constant power dissipation. The most important characteristics of the heater slab 534 are the self-regulating temperature behavior of the thermistors 538 and the fact that the thermistors 538 default to an open circuit configuration if a damaging condition, such as an excessive current condition, occurs. This is illustrated by the large power decrease that occurs over a small temperature range above the Currie point 600.

Referring to FIGS. 1 through 6, the functioning of the U-tube window cleaning fluid heating system 44 can be explained. The U-tube window cleaning fluid heating system 44 is inserted into the conventional windshield cleaning system shown in FIG. 1 in the region indicated by the rectangle 40. It is contemplated that this insertion will be done after the conventional system has already been installed, for example by the vehicle owner, by cutting the tube 16 at the locations 50 and 52, removing the section of the tube 16 from between the locations 50 and 52, and then connecting the system 44 as indicated in FIG. 2, between the locations 50 and 52. However, it is immaterial when, or by whom, the system 44 is installed in the motor vehicle 10. Obviously, the system 44 could just as easily be installed as original equipment by an automobile manufacturer.

After the window cleaning fluid heating system 44 has been installed, two things happen simultaneously when the button 30 is depressed. First, the pump 28 causes unheated windshield cleaning fluid to flow from the reservoir 12, through the tubes 16, 66, 94, 78 and 53, the hollow terminals 74 and 86 and the connectors 54 and 56, to the nozzles 20, where the cleaning fluid is sprayed on the windshield 36 as the stream 32. Second, the timer circuit 146 in the control circuit 124 is activated.

When the button 30 is released, the pump 28 ceases to pump cleaning fluid through the system 44. Gravity, and air that enters the nozzles 20, causes unheated cleaning fluid to drain from the tube 53 back through the system 44 and the tube 16, to the reservoir 12, until the unheated cleaning fluid in the tube 78 reaches the level indicated by the reference location 106. At this level, ambient air enters the "Y" connector 54 and the tube 16 through the check-valve 62, which stops the draining of the unheated cleaning fluid back into the reservoir 12. Because of the U-configuration of the heating tube 94, a volume of unheated cleaning fluid remains trapped in the system 44 between the locations 104 and 106. Because the timer circuit 146 has been activated, the heating element 98 heats the cleaning fluid contained in the heating tube 94. After the windshield cleaning fluid has been heated to the predetermined temperature (72° C.), the system 44 is shut off and the heated cleaning fluid is ready to be sprayed on the windshield 36 when the button 30 is depressed again. If the button 30 is depressed before the cleaning fluid has reached the predetermined temperature, warm cleaning fluid is still dispensed, but it is dispensed at a temperature lower than the predetermined temperature.

It is desirable to have the unheated cleaning fluid drain from the tube 53, as described in the preceding paragraph, because fluid trapped in the tube 53 will not be heated directly by the heating element 98 and would be sprayed on the windshield 36 as an unheated volume of cleaning fluid. By draining the tube 53, it is ensured that the initial spray of cleaning fluid will be heated cleaning fluid. Examination of FIG. 2 shows that even if the tube 53 is drained, a finite volume of unheated fluid might be trapped between the location 106 and the end 96. However, this volume of fluid is kept small by limiting the length of the connecting tube 78, for example to three inches. It is desirable to retain this small volume of cleaning fluid to ensure that the heating tube 94 remains completely filled with cleaning fluid even after air bubbles trapped in the heating tube 94 degas (i.e. the small volume of fluid trapped in the tube 78 replaces the volume vacated by the air bubbles).

In order to ensure that the tube 53 drains properly, several conditions must be met. First, the nozzles 20 must always be the highest point in the system 44. Specifically, the nozzles 20 must be higher than the reference point 110. Second, the reference point 110 must be several inches higher than the location 104. This ensures that air will be injected into the tube 16 at the proper time. Third, for ideal drainage, the reservoir 12 should be lower than the reference point 110. Fourth, the tube 58 and the check-valve 62 should be pointed downward as shown in FIG. 2. This permits a small amount of cleaning fluid to enter the tube 58 and the check-valve 62 during the first spray of cleaning fluid. This helps seal the check-valve 62 and prevents the undesired leakage of air bubbles into the tube 16.

Since the nozzles 20 are usually mounted on the hood of the motor vehicle 10, the first condition will always be met if the system 44 is installed in the engine compartment 13. Conditions two and three are ensured by securing the tubes 16 and 94 in positions that satisfy conditions two and three.

The method of heating the cleaning fluid is called distributive heating because the heating occurs along the entire length of heating element 98. Various physical parameters of the system 44 are selected so that the volume of cleaning fluid contained in the heating tube 94 (approximately 85 ml) will contain approximately 6100 calories of thermal energy after approximately two minutes of heating (the fluid is heated to a temperature of approximately 72° C). It is estimated that this is an adequate amount of energy to cause a solid to liquid phase change in a 0.02 inch thick sheet of ice coated in a ten-inch by ten-inch area on each side of the windshield 36.

Spraying the heated windshield cleaning fluid on the windshield 36 can also be used to reduce or eliminate condensation that forms on the inside of the windshield, for example during cold or humid weather. Condensation forms on the inside of the windshield because a cold/hot interface exists there between the cold windshield glass and the warm moist air that exists inside of the car. By spraying heated windshield cleaning fluid on the windshield 36, the windshield is warmed and the cold/hot interface is moved to the outside surface of the windshield 36. Thus, the condensation will form on the outside surface where it can be removed by the windshield wipers.

The use of heated windshield cleaning fluid is also superior to the use of cold windshield cleaning fluid in removing view-obstructing material from the windshield, such as dirt or bugs, because the solubility of hot cleaning fluid is greater than that of cold cleaning fluid.

The materials and dimensions in the system 44 were selected for a combination of safety and practical reasons. First, the use of nickel ribbon for the heating element 98 is advantageous because the resistivity of nickel is approximately 60 ohms/circular mil/ft. This allows the heating element 98 to have reasonable dimensions. Second, nickel has a large, positive temperature coefficient of resistance (i.e. resistance increases with temperature). This means that as the heating element 98 heats up, the current flow is reduced. This feature is utilized, in conjunction with the temperature sensor 366, to shut down the system 44 when the temperature of the heating element 98 exceeds a predetermined limit. Essentially, the heating element 98 functions as a 37 distributive sensor". Third, by using the heating element 98 having the indicated dimensions to provide distributive heating, the required volume of windshield cleaning fluid can be heated to the predetermined temperature in a reasonable amount of time without the need of using a high surface temperature on the heating element 98. The use of a moderate surface temperature on the heating element 98 is important in a combustible environment such as the engine compartment 13. Fourth, the tube 94 is comprised of a material having a high melting point, such as silicon rubber, to avoid the likelihood of the tube melting. The melting point of the tube 94 is substantially higher than that of the solder in the area 438.

Referring to FIG. 3, the functioning of the control circuit 124 can be explained. The timer circuit 156 is designed to turn the heating element 98 on for an amount of time (e.g. eight minutes) that is longer than necessary to heat the windshield cleaning fluid but which is short enough to prevent the heating element 98 from remaining at the operating temperature for an extended period of time. This is an important safety feature in a scenario where the temperature sensor 366 fails and also protects the battery 24 from draining. The control circuit 124 functions as follows: When the pump button 30 is depressed, a positive current pulse is sent to the pump 28 over the lead 29. This pulse is also conveyed to the control circuit 124 by the lead 128 and causes the capacitor 140 to charge. The voltage on the capacitor 140 is sufficient to turn on the MOSFET 138 which in turn turns on the transistor 152. When the transistor 152 is on, current from the battery 24 flows to the engine speed sensor 188 which turns on the heating element 98 if the engine is running.

The diode 134 prevents the capacitor 140 from discharging via the lead 128. The resistor 142 completes the RC circuit which sets a time constant (usually about eight minutes) for the decay of the capacitor 140. When the voltage across the capacitor drops below a threshold point, the MOSFET 138 is no longer held on. Accordingly, the transistor 152 is turned off and current is no longer provided to the engine speed sensor, thus turning off the heating element 98.

The timer circuit 153 is comprised of discrete components instead of using a CMOS device in order to give the timer circuit a breakdown voltage higher than the approximately 18 volts obtainable with CMOS devices. The timer circuit 153 also draws essentially no current from the battery 24 when the control circuit 124 is off thus protecting the battery 24 from running down.

The engine speed sensor circuit 188 is designed to prevent the heating elements 90 and 114 from being turned on when the engine 14 is not running. This feature prevents the battery 24 from being run down by use of the system 44 when the ignition key is on but the engine 14 is not running. The engine speed sensor circuit 188 exploits the fact that when the engine 14 is running, the voltage supplied by the battery 24 includes the AC component 156. The AC component 156 probably arises from the repeating on/off action in the primary winding of the ignition coil.

The voltage divider created by the series of three resistors 164, 162 and 172, ensures that the inverted terminal of the comparator 158 is normally about 10 mV higher than the noninverted terminal, which means that the output of the comparator 158 is normally low. However, because the AC component 156 passes the transistor 152, it charges the capacitors 176 and 180. The affect of the capacitors 176 and 180 is to deliver a replica of the 50 mV AC component 156 to the resistor 162. This causes the noninverted terminal to periodically swing higher than the inverted terminal, which causes the output of the comparator 158 to go high and creates the rectangular wave 160. Thus, when the engine of vehicle 10 is running, the current is passed through the diode 192. When the engine is not running, no current is passed by the diode 192.

The purpose of the pulse stretcher 282 is to increase the duration of the high voltage parts of the rectangular wave 160 so that the electromechanical relay 242 will remain on when the control circuit 124 is activated and the engine 14 is running. The "stretched" pulse 202 is obtained when the rectangular wave 160 charges the capacitor 232. If the rectangular wave 160 ceases to be present, the resistor 228 rapidly discharges the capacitor 232 so no stretched pulse will be obtained. The time constant (approximately 2.2 sec.) of the RC circuit contained within the pulse stretcher 282 is set to provide a continuous "on" signal whenever the engine speed exceeds a predetermined value. For example, for a four-cylinder vehicle, the predetermined value is approximately 14 revolutions per minute (RPM). This long time constant means that the voltage comparator 200 is held high by the voltage on the capacitor 232. The capacitor 232 is recharged by the rectangular wave 160 before the voltage drops below the threshold voltage for keeping the comparator 200 in the high state. Phrased differently, the pulse stretcher circuit 282 is a retriggerable monostable multivibrator.

The purpose of the heater turn-on circuit 284 is to turn on the heating element 98 when the engine 14 is running and the circuit 124 has been activated. This is accomplished because the stretched pulse 202 turns on the transistor 240 which then allows current from the battery 24 to flow through the solenoid 244. Current flow in the solenoid 244 causes the switch 250 to close which completes the electrical connection between the battery 24 and the terminal 264. The LED 280 serves as a visual indicator that the heating elements 90 and 114 are on.

The purpose of the temperature sensor 366 is to shut the control circuit off if the temperature of the heating element 98 exceeds a predetermined limit (typically about 72° C). This is accomplished by exploiting the large positive temperature coefficient of resistance of nickel (about 5000 ppm/° C). In other words, as the temperature of the nickel heating elements increases, the resistance also increases. The resistor 350 functions as a current sensor to sense a decrease in current flowing in the heating element 98 due to a rise in temperature. Thus, the heating element 98 functions as a "distributive sensor" in the sense that a temperature increase at any point along the length of one of the heating strips 428 will be detected by the temperature sensor 366.

If the current flowing through resistor 350 decreases, there is a corresponding increase in the voltage at the active terminal 102. Eventually, this voltage increase causes the inverting (−) terminal voltage to exceed the voltage of the noninverting (+) terminal which causes the voltage comparator 302 to go low. The open collector output from the comparator 302 then discharges the capacitor 140, which turns off the timer circuit 156 until the button 30 is pressed again. It is very important to note that the voltage comparator 302 is not directly connected to the battery 24 until the switch 250 is closed. Such a design is necessary to prevent the temperature sensor 366 from discharging the capacitor 140 every time the circuit 124 is activated. In the absence of this design, the capacitor 140 would discharge every time the circuit 124 was turned on. This would occur because the initial current state of the current sensing resistor (i.e. zero) would satisfy the condition for making the inverting voltage higher than the noninverting voltage.

FIG. 4 shows that the heating element 98 is actually comprised of a plurality of individual heating strips 428. All of the individual heating strips 428 within a heating tube are electrically connected in parallel. In the preferred embodiment, four of the heating strips 428 are used within the heating tube 94 in order to give the correct resistance to dissipate approximately 240 W of power over the length of the heating tube 94.

The shape and dimensions of the heating strip 428, shown in FIG. 5, are chosen for a combination of practical and technical reasons. First, ribbon having a small width "w" (i.e. narrow ribbon) is very flexible and is thus less likely to break when the system 44 is being moved or installed. In contrast to this factor is the fact that wide, thin ribbon is the ideal configuration in terms of fluid heating characteristics. These factors are balanced by the consideration that 49 mil (0.049 inch) nickel ribbon is commercially available and hence is less expensive to use than a wider ribbon. Second, the design goal for the system 44 is to dissipate 240 W of power through the heating element for about two minutes so that approximately 6100 calories of thermal energy will be added to the cleaning fluid. Since nickel has a resistivity of about 60 ohms/cir. mil/ft, a cross-sectional area of about 400 mil$^2$ with a length of 48 inches is required for the heating element 98. Third, the use of multiple heating strips 428 also yields slightly better solution heating characteristics as compared to a single large heating strip because of the fringing effect that exists along the edges of the individual heating strips 428.

Referring to FIGS. 8 through 12, the functioning of the cartridge heater window cleaning fluid heating system 470 can be explained. The system 470 is installed by attaching the tube 16' to the fluid inlet 476 and the tube 53' to the fluid outlet 482. The cartridge heater 474 is then secured to the frame of the motor vehicle 10' by a connection means such as bolts, glue or tape. The control circuit 492 is also secured to the frame and the required electrical connections to the pump 28' and the battery 24' are made. In situations where the reservoir 12' is higher than the cartridge heater 474, the loop 494 must be formed with the tube 16' so that the loop 494 is higher than the reservoir 12'. As is explained below, this allows cleaning fluid to drain back into the reservoir 12'.

When the button 30' is depressed, the pump 28' pumps unheated cleaning fluid from the reservoir 12' through the cartridge heating system 470. Cleaning fluid enters the chamber 512 via the fluid inlet 476 and fills the chamber 512. When the chamber 512 is full, cleaning fluid is forced out of the chamber 512 through the fluid outlet 482 and is sprayed on the windshield 36' by the nozzles 20'. Because of a siphoning effect, when the button 30' is released, cleaning fluid drains from the tube 53' and the chamber 512 back to the reservoir 12', via the fluid inlet 476 and the tube 16', until the fluid level 530 is below the vent 514. At this point, air drawn in through the nozzles 20' and the fluid outlet 482, enters the passageway 520 and stops the draining of cleaning fluid at the fluid level 530.

When the button 30' is initially depressed, the thermistors 538 in the heater slab 534 are activated and begin to heat up. The heating slab 534 is in thermal contact with the wall 522. This thermal contact allows heat (thermal energy) to flow between the heating slab 534 and the wall 522, causing the wall 522 to heat up with the thermistors 538. Because the heating fins 526 are in thermal contact with the wall 522, heat (thermal energy) is transferred from the wall 522 to the heating fins 526. Cleaning fluid in the chamber 512 surrounds the heating fins 526 and is therefore heated as the heating fins 526 heat up. FIG. 10 shows that the pitch "h" exists between the centerlines of adjacent heating fins 526. Therefore a large surface area of the heating fins 526 is in contact with the cleaning fluid to facilitate the heating process.

After a predetermined period of time (e.g. two minutes), the cleaning fluid has been heated to the predetermined temperature (e.g. 72° C). When the button 30' is pushed again, unheated cleaning fluid is pumped from the reservoir 12' to the fluid inlet 476 and out the end 506. The unheated cleaning fluid pushes the heated cleaning fluid out of the chamber 512 and through the fluid outlet 482, to the nozzles 20', which spray the heated cleaning fluid on the windshield 36'. The vertical orientation of the fins 526 (shown in FIG. 10) effectively divides the chamber 512 into a plurality of compartments (i.e. the spaces that exist between adjacent fins 526). This compartmentalization minimizes the temperature drop across the fins 526 and also minimizes the mixing of unheated and heated cleaning fluid. Such mixing is undesirable because it would lower the temperature of the sprayed fluid. Similarly, the end 506 is positioned close to the bottom 508 so as to maximize the volume of heated fluid that will be pushed out of the chamber 512. The L-shape of the tube 502 is used so that the end 506 will be positioned to deliver cleaning fluid under the heating fins 526 to ensure that heated cleaning fluid is pushed out of the fluid outlet 482. Additionally, the vent 514 is kept small and is positioned facing away from the fluid outlet 486 so as to minimize the mixing of unheated cleaning fluid, that leaks out the vent 514, with heated cleaning fluid. The thermoplastic shield 562 encloses the vessel 510 and provides a thermal barrier between the vessel 510 and other items in the engine compartment 13'.

Referring to FIG. 11, the control circuit 492 functions similarly to the control circuit 124. When the button 30' is depressed, a current pulse is sent to the control circuit 492 over the lead 128' which charges the capacitor 140'. The engine speed sensor 188' and the pulse stretcher circuit 282' generate the stretched pulse 202' and convey it to the MOSFET 554 if the internal combustion engine 14' is running. The stretched pulse 202', which has a magnitude of approximately 12 volts, turns on the MOSFET 554 which permits current to flow to the thermistors 538. The MOSFET 554 functions as a "low side switch" meaning that the switch (MOSFET 554) is placed between the heater slab 574 and ground. The "low side switch" configuration is used because the MOSFET 554 is a three terminal device and requires a large turn-on bias voltage between the gate and source.

It should be noted that because the resistance of the thermistors 538 increases with temperature, the temperature sensor 366' functions as described previously with respect to FIG. 3. In other words, an increase in the temperature of the thermistors and 538 beyond a predetermined amount, results in decreased current being sensed by the current sensing resistor 350'. This causes the comparator 302' to go low and discharge the capacitor 140', thus shutting off the control circuit 492. The low leakage diode 594 is needed between the comparator 302' and the capacitor 140' to prevent the temperature sensor 366' from charging the capacitor 140'.

The MOSFET 554 is mounted on the fluid containment vessel 510 for two reasons. First, the vessel 510 acts as a heat sink to remove heat from the MOSFET 554 that is generated when it is on. Second, the heat imparted to the vessel 510 is used, in conjunction with the heat generated by the thermistors 538, to heat the wall 522 and the fins 526. An additional advantage of using the MOSFET 554 in place of an electromechanical switch, such as the switch 242, is that sparks are not generated by the operation of the MOSFET 558. Furthermore, the MOSFET 558 is much smaller than the electromechanical switch 242.

The PTC thermistors 538 are well-suited for use as heating elements because PTC thermistors provide constant power dissipation within certain temperature ranges, such as the region 604 in FIG. 12. Constant power dissipation is desirable because it minimizes the time required to heat the cleaning fluid contained within the fluid vessel 510. Equation 1 defines power dissipation as it is understood in the present context:

$$\Delta T = \theta \times P \quad (1)$$

where,
$\Delta T$ = temperature change over a distance;
$\theta$ = thermal resistance; and
= power dissipation.

In view of equation 1, power dissipation can be increased by lowering the thermal resistance $\theta$ of the vessel 510. In the system 470, power dissipation is increased in three ways, First, the plate 522 is attached to the plurality of fins 526 thereby creating a large surface area for heat exchange which lowers the thermal resistance $\theta$. Second, the use of the plurality of thermistors 538 to heat the plate 522 also reduces the thermal resistance $\theta$. Third, a portion of the power is dissipated by the MOSFET 554 which effectively lowers the power P. Taken together, these three factors work together to yield a small $\Delta T$ and to ensure that the thermistors 538 operate in the region 604 illustrated in FIG. 12.

Figure 13:
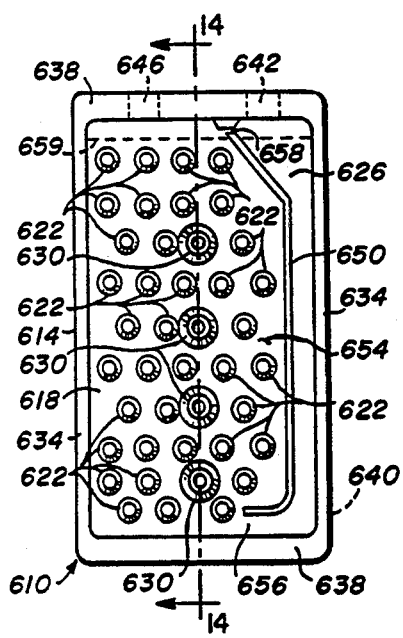
FIG. 13 illustrates another embodiment of the present invention referred to as a pin-type cartridge heater.

FIG. 13 shows another embodiment of the present invention referred to as a pin-type cartridge heater designated by the general reference numeral 610. The pin-type cartridge heater 610 functions analogously to the cartridge heater 474 and can be substituted for the cartridge heater 474 shown in FIGS. 8–10. The pin-type heater 610 comprises a fluid containment vessel 614 which includes a fluid chamber 618, a plurality of heating pins 622 and a fluid passageway 626. A plurality of studs 630 provide sites for accepting fasteners, such as screws, for attaching items to the containment vessel 614.

Figure 14:
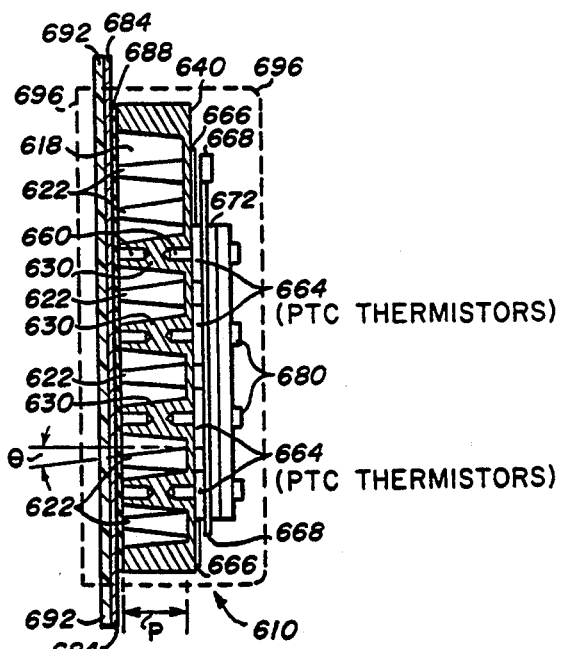
FIG. 14 is a cross-sectional view of the pin-type cartridge heater taken along the line 14-14 in FIG. 13.

The fluid containment vessel 614 is rectangular in shape and is formed by a pair of long walls 634 and a pair of short walls 638 (all of the walls 634 and 638 have the same height "p" shown in FIG. 14), and a back wall 640 (which is more clearly shown in FIG. 14. A fluid inlet aperture 642 extends through one of the short walls 638 to allow windshield (window) cleaning fluid to enter the fluid passageway 626 from the fluid reservoir 12' (shown in FIG. 8), for example, by connecting the tube 16' to the aperture 642 using a plastic tubing connector inserted in the aperture 642. A fluid outlet aperture 646 extends through the same short wall 638 that contains the aperture 642 to allow windshield cleaning fluid that has passed through the fluid chamber 618 to be passed to the nozzles 20', for example by connecting the tube 53' (shown in FIG. 8)to the aperture 646 using a plastic tubing connector.

The fluid chamber 618 is the region that exists between the two pairs of walls 634 and 638 and the back wall 640, and is capable of holding a volume of windshield cleaning fluid of approximately 100 ml. The fluid passageway 626 is formed by a dividing wall 650 which has the same height "p" as the two pairs of walls 634 and 638 and divides the chamber 618 into two unequal parts, the fluid passageway 626 and a fluid heating region 654 which contains the heating pins 622 and the studs 630. The fluid passageway 626 is open at an end 656 thereby permitting windshield cleaning fluid to flow from the fluid passageway 626 into the heating region 654. A vent 658, which is a small passageway that connects the fluid passageway 626 to the fluid heating region 654, is positioned in the dividing wall 650 at a position close to the aperture 642. A fluid level line 659 indicates the approximate level of the windshield cleaning fluid in the fluid containment vessel 614 during the fluid heating process.

Typically, the fluid containment vessel 614 (including heating pins 622 and the dividing wall 650) is comprised of a metal such as aluminum. In the preferred embodiment, aluminum 380-3% Zn is used. The aluminum alloy ADC-12 is also acceptable. The outer surfaces of the fluid containment vessel 614 are chemically treated with a material such as Alodine (chemical film) to prevent oxidation of the aluminum. The interior surfaces of the fluid containment vessel 614 are also treated to prevent corrosion from the cleaning fluid. In the preferred embodiment, the interior surfaces are anodized (0.001/0.002 inches thick). A fluoropolymer coating would also provide acceptable protection for the interior surfaces (e.g. Xylan 1010 or 1070).

FIG. 14 is a cross-sectional view of the fluid containment vessel 614 taken along the line 14–14 in FIG. 13 (in FIG. 14 some additional elements, not shown in FIG. 13, are illustrated). Examination of FIG. 14 shows that the heating pins 622 are cylindrical structures that are tapered at an angle $\theta$ and that extend from the back wall 640 into the fluid chamber 618 and have a height that is slightly less than the height "p" of the walls 634 and 638. For example, if "p" is equal to approximately 0.690 inches, then the height of the pins 622 is approximately 0.680 inches. Typically, the heating pins 622 are tapered at a 4.5° angle (angle $\theta$ in FIG. 14) for manufacturing purposes. The studs 630 are also tapered cylinders having the same height as the heating pins 622, and each stud 630 includes a pair of cavities 660 for accepting a fastening device such as a screw.

A plurality of thermistors 664 are mounted on the side of the back wall 640 that faces away from the heating pins 622 (i.e. the thermistors 664 are mounted outside of the fluid chamber 618 on the fluid containment vessel 614). The thermistors 664 are PTC thermistors, such as barium titanate thermistors, and typically, eight separate thermistors are connected in parallel. Typically, thermistors having a Currie point of approximately 120° C. are utilized as the thermistors 664.

A template 666 is positioned around the thermistors 664 to assist in holding the thermistors 664 in place. A metal contact 668 is positioned between the thermistors 664 and a spring clamp 672 and provides a means for establishing an electrical connection between the thermistors 664 and a control circuit 676 (shown in FIG. 15). The spring clamp 672 functions to hold the thermistors 664, the template 666 and the metal contact 668 in place. The spring clamp 672 is secured to the fluid containment vessel by a plurality of fastening units 680 such as screws.

The open face of the fluid containment vessel 614 (i.e. the side opposite the back side 640) is closed with a metal (aluminum) plate 684. A silicone rubber gasket 688 is positioned along the tops of the walls 634 and 638 to insure a fluid tight seal by the plate 684. A plastic cap 692 is positioned over the plate 684. A protective casing 696, typically comprised of nylon material, surrounds the fluid containment vessel 614 to provide a protective barrier between the fluid containment vessel 614 and the engine compartment 13' (shown in FIG. 8). Typically, the pin-type cartridge heater 610 is mounted on a wall of the engine compartment 13' and the plate 684 is electrically grounded to the chassis of the vehicle 10.

Comparison of the pin-type cartridge heater 610 (shown in FIGS. 13 and 14) to the cartridge heater 474 (shown in FIGS. 8-10), shows that the two cartridge heaters 610 and 474 are very similar in design and function. Referring to FIGS. 8,13 and 14, when the pump button 30' is pressed a first time, cleaning fluid enters the fluid passageway 626 and passes through the end 656 to the fluid heating region 654 as the thermistors 664 are activated (as is explained in relation to FIG. 15). Heat from the thermistors 664 is transferred through the back wall 640 and the heating pins 622 to heat the cleaning fluid contained in the fluid heating region 654. When the pump button 30' is pressed a second time (after a suitable time interval) unheated cleaning fluid again enters the fluid containment vessel 614 through the inlet aperture 642. This forces the hot windshield cleaning fluid contained in the fluid chamber 618 out of the fluid containment vessel 614 through the outlet aperture 646 and into the tube 53' where it is sprayed on the windshield 36' by the nozzles 20'.

After windshield cleaning fluid is sprayed on the windshield 36', the cleaning fluid remaining in the tube 53' and the fluid containment vessel 614 begins to drain back into the reservoir 12'. This drainage causes air to be sucked through the nozzles 20' until the air level reaches the vent 658. At this point the drainage stops leaving windshield cleaning fluid in the fluid containment vessel 614 at the approximate level indicated by the fluid level line 659. This process is completely analogous to the drainage process that occurs in the fluid containment vessel 510 and described previously with respect to the vent 514 shown in FIG. 9.

Figure 15:
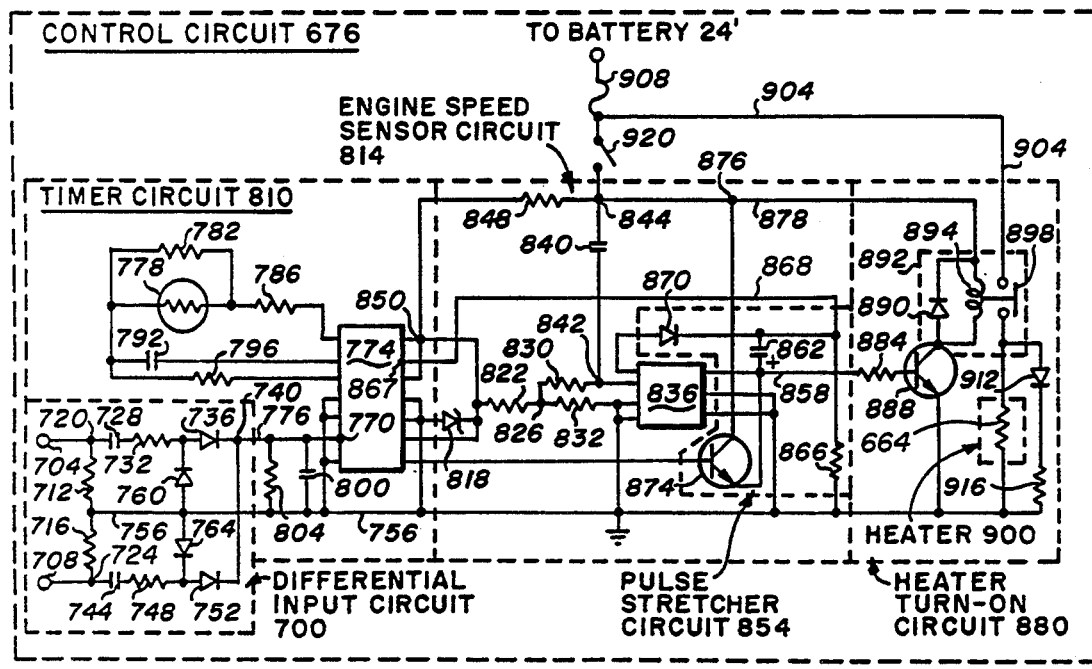
FIG. 15 is a circuit diagram of a control circuit for use with the pin-type cartridge heater.

FIG. 15 illustrates the control circuit 676 that is used to control the heating of the pin-type cartridge heater 610. The control circuit 676 functions analogously to the control circuit 492 (shown in FIGS. 8 and 11) and can be substituted for the control circuit 492 in the cartridge heater window cleaning system 470 shown in FIG. 8.

In the control circuit 676, a differential input circuit 700 is connected to a pair of terminals 704 and 708 which are the electrical connections to the washer pump 28' shown in FIG. 8. A pair of resistors 712 and 716 are connected between a pair of nodes 720 and 724. A capacitor 728, a resistor 732 and a diode 736 are connected between the node 720 and a node 740. Similarly, a capacitor 744, a resistor 748 and a diode 752 are connected between the node 724 and the node 740. A ground lead 756 is connected between the pair resistors 712 and 716. A diode 760 is connected between the ground lead 756 and the resistor 732 and diode 736. A diode 764 is connected between the ground lead 756 and the resistor 748 and diode 752.

The purpose of the differential input circuit is to ensure that a usable signal will be extracted from the terminals 704 and 708 whenever the pump button 30' (shown in FIG. 8) is used to send a signal to the pump 28' (to initiate the pumping of windshield cleaning fluid). This feature is useful for several reasons. First, with respect to the terminals 704 and 708, one of these is a "hot" terminal and one is a ground terminal. During the installation of a control circuit, such as the control circuit 492, it would be possible to reverse the ground and hot wire connections. The use of the differential input circuit 700 in the control circuit 676 renders such a reversal irrelevant. Second, depending on the manufacturer, some pumps 28' utilize low side switch configurations whereas others utilize high side switch configurations at the terminals 704 and 708. Use of the differential input circuit 700 renders the high side/low side switch distinction irrelevant, thereby ensuring that the control circuit 676 will be compatible with all washer pumps 28', regardless of their design.

The differential input circuit 700 functions as follows: The capacitors 728 and 744 ensure that only the leading and trailing edges of the signal generated when the pump button 30' is pressed are transmitted to the node 740. This function eliminates the distinction between the "high side" and "low side" characteristics of the terminals 704 and 708. This point is made clearer by realizing that a timer circuit in the IC 774 (discussed below) is triggered by a logic high, and hence a low side switch signal would leave the timer in a permanently "on" condition in the absence of the differential input circuit 700. The RC time constant of the capacitors 728 and 744 is set so as to yield a wide enough pulse to trigger the timer in the IC 774.

The diodes 736, 752, 760 and 764 act as a full wave (bridge) rectifier to ensure that a signal of uniform (positive) polarity is always outputted at the node 740. The presence of the full wave rectifier ensures that the control circuit 676 will function properly regardless of whether the node 720 is connected to the terminal 704 and the node 724 is connected to the terminal 708 or vice versa.

The differential input circuit 700 delivers the signal of uniform positive polarity to an input pin 770 of a timer integrated circuit (IC) chip 774 via a trigger lead 776. The timer IC 774 is a commercially available CMOS chip, such as the chip MC14541BD available from Motorola, that includes an internal oscillator and a counter. When the timer IC 774 is on, the thermistors 664 are electrically connected to the battery 24' (as is explained below) and therefore provide heat to the back wall 640 and the pins 622.

A negative temperature coefficient (NTC) thermistor 778, a resistor 782 and a resistor 786 are connected to another input of the IC 774 to make the frequency of the internal oscillator dependent on the ambient temperature in the vicinity of the control circuit 676 (i.e. the counter is left on longer when the ambient temperature is cold to provide for a longer heating period by the thermistors 664). The resistor 782 is connected in parallel with the thermistor 778 and the resistor 786 is connected in series with the thermistor 778.

A capacitor 792 and a resistor 796 are connected to other inputs of the IC 774. The capacitor 792 acts in conjunction with the resistors 778, 782 and 786 to set an RC time constant that controls the oscillation frequency of the internal oscillator (and hence the period that the timer is on). The arrangement of the three resistors 778 (thermistor), 782 and 786 and the temperature dependence of the thermistor 778 yield a continuous range of time constants for the RC circuit between low temperatures (approximately −5 to −10° C.) where the resistance of the thermistor 778 is huge, to high temperatures where the resistance of the thermistor 778 is virtually zero. The values of the components in the RC circuit are chosen so that at 25° C. the timer is on for about 150 seconds and at low temperatures, the timer is on for about 170 seconds.

A capacitor 800 and a resistor 804 are connected in parallel between the trigger lead 776 and the ground lead 756 to establish a low pass filter that suppresses oscillation noise.

The circuit elements described in the preceding three paragraphs form a timer circuit 810 which is used to control the time period during which the thermistors 664 will be turned on for the purpose of heating windshield cleaning fluid contained in the fluid containment vessel 614. The timer circuit 810 is analogous to the timer circuits 153 and 153' described previously with respect to FIGS. 3 and 11, but uses digital counting techniques and temperature dependence to replace the simple RC timers used in the timer circuits 153 and 153'.

The output of the IC 774 is inputted to an engine speed sensor circuit 814 through a Zener diode 818 which protects the IC 774 from transient voltages. A resistor 822 is connected between the diode 818 and a node 826. A resistor 830 and a resistor 832 are connected between the node 826 and an inverting pin and noninverting pin, respectively, of an integrated circuit (IC) chip 836 (i.e. the resistor 830 is connected to the inverting pin). The IC 836 is a commercially available chip (such as the National Semiconductor chip, part number LM2904M) that can function as a voltage comparator as was described previously with respect to the IC's 158 and 158' shown in FIGS. 3 and 11. The resistors 822 and 832 form a voltage divider which ensures that a voltage of approximately 12 mV will be maintained at the node 826 (the combined resistance of the resistors 822 and 832 is approximately 2.2 Mohms) and the 12 mV is added to the inverting pin but not to the noninverting pin. A capacitor 840 is connected between a node 842 and a node 844. A resistor 848 is connected between the node 844 and a node 850.

The purpose and method of functioning of the engine speed sensor circuit 814 is similar to the purpose and method of operation of the engine speed sensor circuits 188 and 188' described previously with respect to FIGS. 3 and 11. Basically, the capacitor 840 delivers a replica of the 50 mV AC engine noise component (AC component 156 in FIG. 3) to the inverting pin of the IC 836 causing the output of IC 836 to go high and a rectangular waveform (e.g. the rectangular wave 160 in FIG. 3) to be outputted to a pulse stretcher circuit 854.

The output of the IC 836 is directed to the pulse stretcher circuit 854 by a lead 858. A capacitor 862 and a resistor 866 establish an RC time constant of approximately 2.2 seconds. The capacitor 862 is connected to a pin 867 of the IC 774 by a lead 868. The pin 867 must be held in a high voltage state in order for the IC 774 to remain on. The RC time constant of the capacitor 862 is long enough to hold the pin 867 in a high state until the capacitor 862 is recharged by the AC engine noise signal. If the AC engine noise signal disappears (i.e. if the engine is shut off), the resistor 866 rapidly discharges the capacitor 862, the pin 867 goes low and the IC 774 essentially shuts off (or more correctly the IC 774 is reset to count very quickly). A diode 870 allows the capacitor 862 to be charged from an output pin of the IC 836 while preventing the capacitor 862 from discharging through that pin.

The capacitor 862 is also connected to an NPN transistor 874. The base of the transistor 874 is connected to a high voltage pin of the IC 774. This arrangement is utilized to ensure that the pin 867 will be held at high voltage during the initial seconds that the control circuit 676 is turned on, before the capacitor 862 has had time to be charged by the AC engine noise signal. The emitter is connected to the lead 858 and the collector is connected to a node 876 on a lead 878.

The output of the pulse stretcher circuit 854 activates a heater turn-on circuit 880. The lead 858 is connected to a resistor 884 that is connected to the base of an NPN transistor 888. The collector of transistor 888 is connected to a diode 890 within an electromechanical relay (switch) 892 that also includes a solenoid 894 and a contact 898. The emitter of transistor 888 is connected to ground. Thus, output from the pulse stretcher circuit 854 is directed to the transistor 888 which causes the contact 898 to close. Conversely, the absence of output from the pulse stretcher circuit 854 causes the contact 898 to remain open.

When output from the transistor 888 causes the contact 898 to close, a heater 900 is connected to the battery 24' through a lead 904 and a fuse 908, thereby causing the heater 900 to begin heating.

The heater 900 comprises the plurality of thermistors 664 shown in FIG. 14. As is shown in FIG. 14, the thermistors 664 are actually positioned on the fluid containment vessel 614, not on the control circuit 676. The thermistors 664 are connected to the control circuit 676 using long lead wires and the metal contact 668.

A light emitting diode (LED) 912 and a resistor 916 are connected in parallel with the heater 900 to indicate when the heater is on. Typically, the entire control circuit 676 is encased in a protective covering such as a nylon case and the LED 912 is positioned on the outside of the protective covering so as to be visible in the engine compartment 13'.

An on/off switch 920, a low power switch connected between the lead 904 and the node 844, can be used to disconnect the control circuit 676, for example during the summer when heated cleaning fluid will not be required. The control for the on/off switch is also positioned on the outside of the protective covering that surrounds the control circuit 676 for easy access.

Comparing the control circuit 676 to the control circuit 124 shows that the temperature sensor 366 of the control circuit 124 is not present in the control circuit 676. In the control circuit 676, the digital timing function provided by the IC 774 is used to control the heating (i.e. the heater 900 is only turned on for a predetermined amount of time). Additionally, since the Curie point of the thermistors 664 is selected to be about 120° C., the thermistors 664 are inherently temperature limiting in that they will not overheat even if the control circuit remains on longer than it is supposed to.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A windshield cleaning fluid heating system comprising:
    a metal vessel having an internal chamber for holding a volume of windshield cleaning fluid, the metal vessel being connected between a windshield cleaning fluid reservoir and at least one nozzle means for spraying a stream of windshield cleaning fluid on a windshield, whereby windshield cleaning fluid can be pumped from said reservoir, through said internal chamber and to said nozzle means;
    a plurality of metal pins extending into said internal chamber and in thermal contact with a heater wall of said metal vessel, each of said plurality of metal pins having a tapered cylindrical shape;
    at least one thermistor positioned on said heater wall outside of said internal chamber, for providing heat to said heater wall and to the plurality of metal pins; and
    a control means electrically connected to the thermistor for controlling the heat provided by the thermistor, the control means comprising a timing means for setting a period of time during which the thermistor will heat said volume of cleaning fluid, an engine sensor means for sensing whether an internal combustion engine is running and for preventing the thermistor from being activated if said internal combustion engine is not running and a differential input circuit means for ensuring that a usable signal is delivered to said timing means independent of the manner in which said control means is connected to a pair of electrical terminals of a pump for pumping windshield cleaning fluid from said reservoir to said nozzle means.

2. The windshield cleaning fluid heating system of claim 1 wherein,
    said timing means comprises an integrated circuit having an internal oscillator and a counter.

3. The windshield cleaning fluid heating system of claim 1 wherein,
    the engine sensor means comprises a voltage comparator.

4. A window cleaning fluid heating system that comprises:
    a holding means for holding a volume of cleaning fluid, the holding means being adapted for connection between a cleaning fluid reservoir and a means for spraying said volume of cleaning fluid on a window;
    a heating means for heating said volume of cleaning fluid held in the holding means; and
    a control means electrically connected to said heating means for controlling the heating of said volume of cleaning fluid, the control means comprising a timing means for establishing a period of time during which the heating means will heat said volume of cleaning fluid and a temperature dependent means for causing said timing means to activate said heating means for a longer period of time when an ambient temperature is lower than a reference value.

5. The window cleaning fluid heating system of claim 1 wherein,
    said timing means comprises an integrated circuit having an internal oscillator and a counter.

6. The window cleaning fluid heating system of claim 5 further comprising:
    a differential input circuit means for ensuring that a usable signal is delivered to said integrated circuit independent of the manner in which said control means is connected to a pair of electrical terminals of a pump for pumping cleaning fluid from said reservoir to said window.

7. The window cleaning fluid heating system of claim 6 wherein,
    said usable signal is a signal having a uniform positive polarity.

8. The window cleaning fluid heating system of claim 4 wherein,
    the control means includes an engine sensor means for sensing whether an internal combustion engine is running and a pulse stretching means for increasing the time duration of a signal generated by said engine sensor means.

9. A windshield cleaning fluid heating system comprising:
    a vessel having an internal chamber for holding a volume of windshield cleaning fluid, the vessel being connected between a windshield cleaning fluid reservoir and at least one nozzle means for spraying windshield cleaning fluid on a windshield, whereby windshield cleaning fluid can be pumped from said reservoir, through said internal chamber and to said nozzle means;
    a heat conducting means extending into said internal chamber and in thermal contact with a heater wall of said vessel for transferring heat from said heater wall to said volume of windshield cleaning fluid;
    a heating means positioned on said heater wall outside of said internal chamber, for providing heat to said heater wall; and
    a control means electrically connected to the heating means for controlling the heat provided by the heating means, the control means comprising a timing means for setting a period of time during which the heating means will provide heat to said heater wall and a temperature dependent means for causing said timing means to activate the heating means for a longer period of time when an ambient temperature is lower than a reference value.

10. The window cleaning fluid heating system of claim 9 wherein, said timing means comprises an integrated circuit; and said control means further comprises a differential input circuit means for ensuring that a usable signal is delivered to said integrated circuit independent of the manner in which said control means is connected to a pair of electrical terminals of a pump for pumping cleaning fluid from said reservoir to said window.

* * * * *